May 26, 1964  B. M. L. HEUZE  3,134,731
FLEXIBLE ANODE DEVICE FOR USE IN THE CATHODIC
PROTECTION OF METAL STRUCTURES
Filed Feb. 1, 1961  2 Sheets-Sheet 1
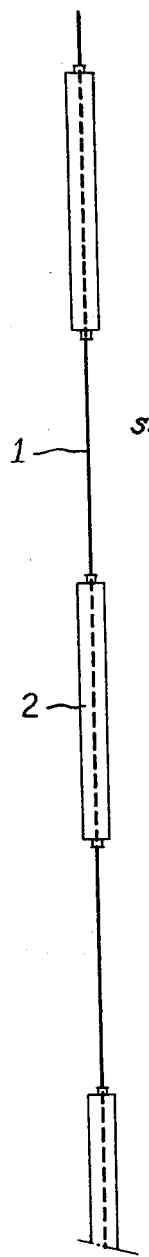
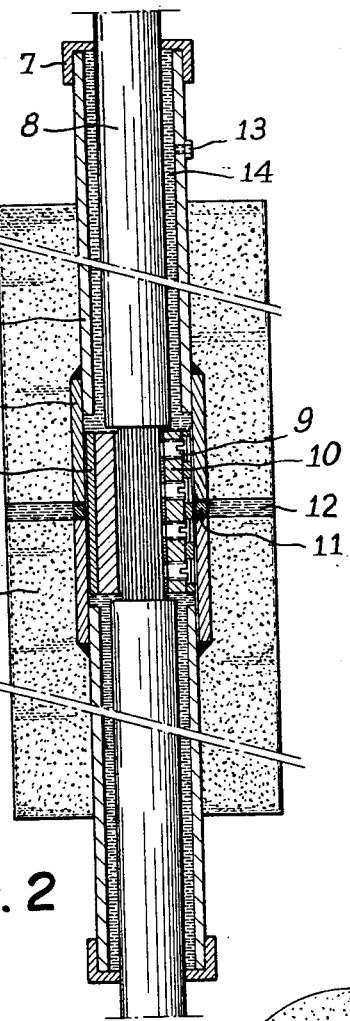
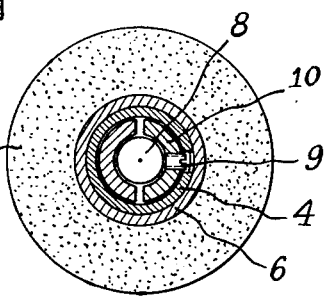
INVENTOR
B. M. L. Heuze
By Holcomb, Wetherill & Brisebois
ATTORNEYS United States Patent Office 3,134,731
Patented May 26, 1964

3,134,731
FLEXIBLE ANODE DEVICE FOR USE IN THE CATHODIC PROTECTION OF METAL STRUCTURES
Bernard Marie Louis Heuze, Paris, France, assignor to Societe a responsabilite limitee dite: Societe d'Etudes Contre la Corrosion (S.E.C.C.O.), Paris, France
Filed Feb. 1, 1961, Ser. No. 86,474
Claims priority, application France Feb. 5, 1960
4 Claims. (Cl. 204—196)

The present invention has as an object a flexible anode device, for use in the cathodic protection of metal structures which are liable to corrosion.

It is known that when metal structures such as a buried conduit or an immersed floating dock are to be protected against corrosion, they may be given cathodic protection by taking them to a certain potential, which is more negative than their spontaneous polarization potential.

One of the processes of cathodic protection consists in connecting to the structure to be protected the negative pole of a source of direct current, the positive pole of which is otherwise connected to a current overflow device immersed in a medium offering a certain electrical continuity with the medium which encloses the structure.

The current overflow constitutes an anode device, and is exemplified by steel rails or carbon electrodes.

The present invention has as a primary object, an improved anode device allowing the current emissions to be distributed at the most appropriate places, and yet, when necessary, having a flexibility which allows it to deform.

The invention also has as an object a system incorporating the anode device according to the invention.

Such a system may comprise an assembly of electrodes disposed at suitable intervals on a continuous metal cable, electrically insulated from the ambient medium, which passes axially through them without being interrupted or broken into sections and which at the same time serves to support them and to act as an electric current feeding conductor.

The invention also has as an object a device forming the electrode which can be mounted upon a cable without breaking the latter into sections.

Accordingly, the invention provides an electrode for protection against corrosion, comprising two parts each consisting of a hollow member cast in position, on a metal tube, threaded inner tube means interconnecting said electrode parts, a metal sleeve located within said threaded inner tube, means for securing said metal sleeve to a bared portion of an insulated cable when passed axially through said electrode, said metal tube being of larger diameter than said insulated cable.

The invention also provides an anode protective device, comprising an electrode as set forth in the preceding paragraph, an insulated cable located to pass through said electrode, a bared part of said cable located within said metal sleeve, and a filling of a sealing compound within said electrode between said insulated cable and said metal tube.

The invention further provides a cathodic protection device comprising a plurality of electrodes as set forth above, a common insulated cable passing axially through all of said electrodes, said cable having a plurality of spatially-separated bared portions thereon corresponding in number to the number of said electrodes, each of said bared portions being located within the said metal sleeve of one of said electrodes, and a filling of a sealing compound within each of said electrodes between said insulated cable and said metal tube thereof.

Other characteristics of the invention will appear in the course of the description which will follow.

In order that the invention shall be more clearly understood, reference will now be made to the accompanying drawings, which show one specific embodiment thereof, and a method of use thereof, by way of example only, and in which:

FIGURE 1 shows the general assembly of a device according to the invention,

FIGURE 2 shows a detail of the mounting of an electrode on the cable,

FIGURE 3 shows a transverse section through the arrangement of FIGURE 2, and

Figure 4:
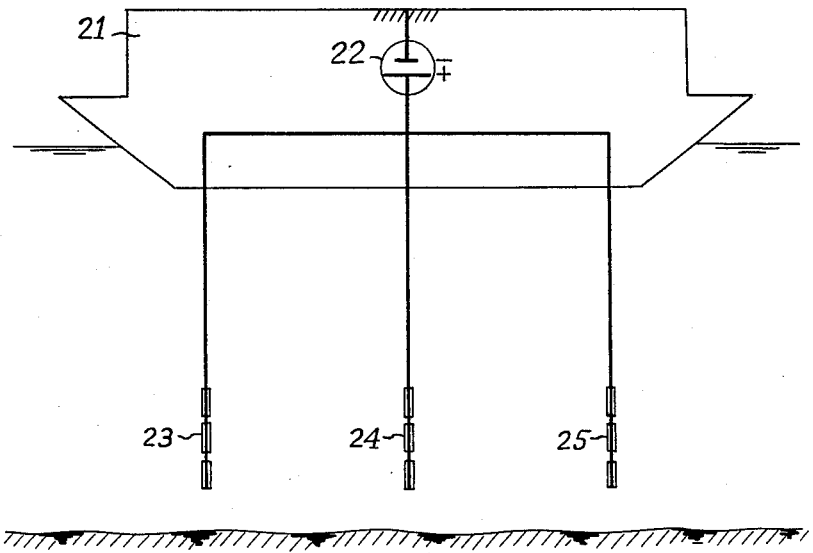
FIGURE 4 shows by way of example the installation on a floating apparatus such as a dock, of a system of devices according to the invention.

Referring to the drawings, in the embodiment shown in FIGURE 1, an electrically insulated continuous metal cable 1 passes axially through electrodes 2.

The securing means for fixing each electrode on the cable and effecting electrical connection thereto is located inside the electrode in such a way as to be protected from any electrolytic corrosion during the period of use of the anode device.

The detail in FIGURE 2 shows that the electrode actually comprises two half-electrodes 3, assembled together by locking onto a threaded inner tube 4.

In the embodiment shown the electrode consists of high silicon cast iron, the machining of which is practically impossible.

Each semi-electrode is cast onto a steel tube 5 having secured thereto at one end, on the assembly side, an internally threaded sleeve 6, and having at the other end a gland or stuffing box 7.

The insulation of the metal cable 8 is locally removed in order to allow the fixing and the metal to metal contact of the electrode.

This contact is established by means of locking screws 9, located in an axially-split metal sleeve or collar 10 disposed between the metal cable and the internal wall of the threaded inner tube 4.

As shown in FIGURE 3, the metal sleeve or collar 10 is made up of two semi-cylindrical parts which, when in place, surround the bared cable; the inner diameter of the sleeve or collar 10 is the same as the diameter of the bared cable; the outer diameter of the sleeve or collar 10 is substantially equal to the internal diameter of the tube 5 on to which the electrode has been cast. The internal diameter of the threaded inner tube 4 is equal to the outside diameter of the sleeve or collar 10, and to the inside diameter of the steel tube 5. The thickness of the tube 4 is substantially the same as that of the tube 5.

The locking together of the two half-electrodes is effected by a threaded steel ring 11 screwed over threaded tube 4, and by a hermetic seal 12.

Through an end plug 13 is injected a sealing compound 14, which penetrates into all the gaps appearing between the continuous metal cable, its insulation and the walls inside the electrode and the fixing means.

To assemble the electrode on the cable, the insulation is removed from a selected zone of the cable, the two part axially-split collar 10 is placed rounnd the bared conductor at 20, and the tube 4 is run up the outside of the cable and slipped over the collar 10. The screws 9 are then tightened through apertures in tube 4 so as to clamp tube 4 and collar 10 on the bared cable. Then a first tube 5, located round the outside of cable 8 to one side of the bared conductor, and carrying a first internally threaded sleeve 6 at its end, is screwed onto the tube 4, and the first part of electrode 3 is cast in position round part of tube 5 and the whole of the threaded sleeve 6. The ring 11 is then screwed over tube 4 and the seal 12 is applied. Subsequently a second tube 5, located round the outside of cable 8 to the other side of the bared conductor 20, and carrying a second threaded sleeve 6 at its end, is screwed onto the projecting end of tube 4 and the second part of electrode 3 is cast in position. Finally the sealing compound is run in at plug 13 and the stuffing boxes 7 are applied. Any sealing compound known to technicians in this art may be employed. Examples of such well-known compounds are polychloroprene with a hardener, or an epoxy resin with a hardener, and many compounds of this kind are readily available on the open market.

FIGURE 3 shows a transverse section of the assembly and showing, from the outside to the inside, the half electrode 3, the metal sleeve 6, the threaded inner tube 4, the sleeve or collar 10, a locking screw 9 and the metal cable 8.

FIGURE 4 diagrammatically shows the hull 21 of a floating apparatus such as a dock, the cathodic protection of which is carried out by means of a direct current generator, schematically illustrated a 22, and three anode devices 23, 24, 25 according to the invention fixed on each side.

The distribution of the electrodes on a cable and their distance from the hull are calculated in such a way as to obtain a uniform cathodic protection.

The electrodes do not necessarily have to be on the sea or river bed and they move with the hull.

In the case of a floating dock, they require no special precaution when the dock is immersed for the entry or the exit of a ship, for in that case the flexible cables absorb the deformation while is temporarily imposed upon them. The continuous cables allow the assembly to resist the stresses, which are sometimes enormous, which can be exerted.

If necessary it is easy to take the anode device on board in order to move the floating apparatus such as a dock.

The anode device can be used in any other condition by reason of its simplicity of use and its robustness.

I claim:

1. An electrode and cable combination for protection against corrosion, comprising an axially-split cylindrical metal collar located within an externally threaded metal tube, clamping means securing said collar and said tube around a bared portion of a continuous insulated cable, and two assemblies surrounding said cable at axially spaced positions each of said assemblies including a metal tube surrounding an insulated portion of said cable axially separated from said bared portion, an internally threaded metal sleeve carried at one end of said metal tube and projecting axially therefrom and screwed around said externally threaded tube, and a silicon iron electrode portion cast in position around part of said metal tube and around the whole of said internally threaded metal sleeve.

2. A protective anode and cable combination comprising an axially-split cylindrical metal collar located within an externally threaded metal tube, clamping means securing said collar and said tube around a bared portion of a continuous insulated cable, a first metal tube surrounding a first insulated portion of said cable axially separated from said bared portion, a first internally threaded metal sleeve carried at one end of said first metal tube and projecting axially therefrom and screwed around said externally threaded metal tube, a first silicon iron electrode portion cast in position around part of said first metal tube and around the whole of said first internally threaded metal sleeve, a second metal tube surrounding a second insulated portion of said cable axially separated from said bared portion and on the other side of said bared portion with respect to said first insulated portion, a second internally threaded metal sleeve carried at one end of said second metal tube and projecting axially therefrom and screwed around said externally threaded metal tube to be axially separated from said first internally threaded metal sleeve, a second silicon iron electrode portion cast in position around part of said second metal tube and around the whole of said second internally threaded metal sleeve, a ring screwed around said externally threaded tube and located between said first and said second electrode portions to define a gap, a hermetic seal within said gap, and a filling of sealing compound between said insulated portions of said cable and the surrounding metal tubes.

3. The combination claimed in claim 2 and comprising further a gland on the end of each of said metal tubes remote from said bared portion of cable.

4. A cathode protection device comprising a plurality of the combinations claimed in claim 2 and located upon a continuous length of cable, said combinations being axially separated.

References Cited in the file of this patent

UNITED STATES PATENTS

| | | |
|---|---|---|
| 1,788,485 | Gunderson | Jan. 13, 1931 |
| 2,609,340 | McMahon et al. | Sept. 2, 1952 |
| 2,851,413 | Hosford | Sept. 9, 1958 |
| 2,876,190 | Oliver | Mar. 3, 1959 |
| 3,043,765 | Bryan et al. | July 10, 1962 |